United States Patent

Jamieson

[11] Patent Number: 5,823,466
[45] Date of Patent: Oct. 20, 1998

[54] PROPELLER BALANCING METHOD AND APPARATUS

[76] Inventor: Frederick T. Jamieson, 3219 Monier Cir., Rancho Cordova, Calif. 95742

[21] Appl. No.: 512,551

[22] Filed: Aug. 8, 1995

[51] Int. Cl.$^6$ .................................................. B64C 11/20
[52] U.S. Cl. ........................... 244/65; 29/406; 29/901; 74/573 R
[58] Field of Search ................ 244/1 R, 65; 416/500; 29/88 R, 901, 406; 74/573 R

[56] References Cited

U.S. PATENT DOCUMENTS

| | | | |
|---|---|---|---|
| 283,630 | 8/1883 | McCormick | 29/406 |
| 1,980,693 | 11/1934 | Newman et al. | 74/573 R |
| 2,334,285 | 11/1943 | Philippi | 74/573 R |
| 2,336,697 | 12/1943 | Moeller | 74/573 R |
| 2,459,947 | 1/1949 | Leflar | 74/573 R |
| 3,207,557 | 9/1965 | Huwter | 29/406 |
| 5,516,054 | 5/1996 | Machida et al. | 29/901 |

*Primary Examiner*—Galen L. Barefoot
*Attorney, Agent, or Firm*—Larry D. Johnson

[57] ABSTRACT

A method and apparatus to balance propeller blades including, but not limited to, those used on model aircraft provides relocation of the propeller's center mounting hole to the propeller's center of mass by installation of appropriate eccentric bushings into the center mounting hole, and preferably into an oversize center mounting hole that has been created in the propeller hub. Both spanwise and chordwise propeller balance can be made with this eccentric bushing method.

6 Claims, 2 Drawing Sheets

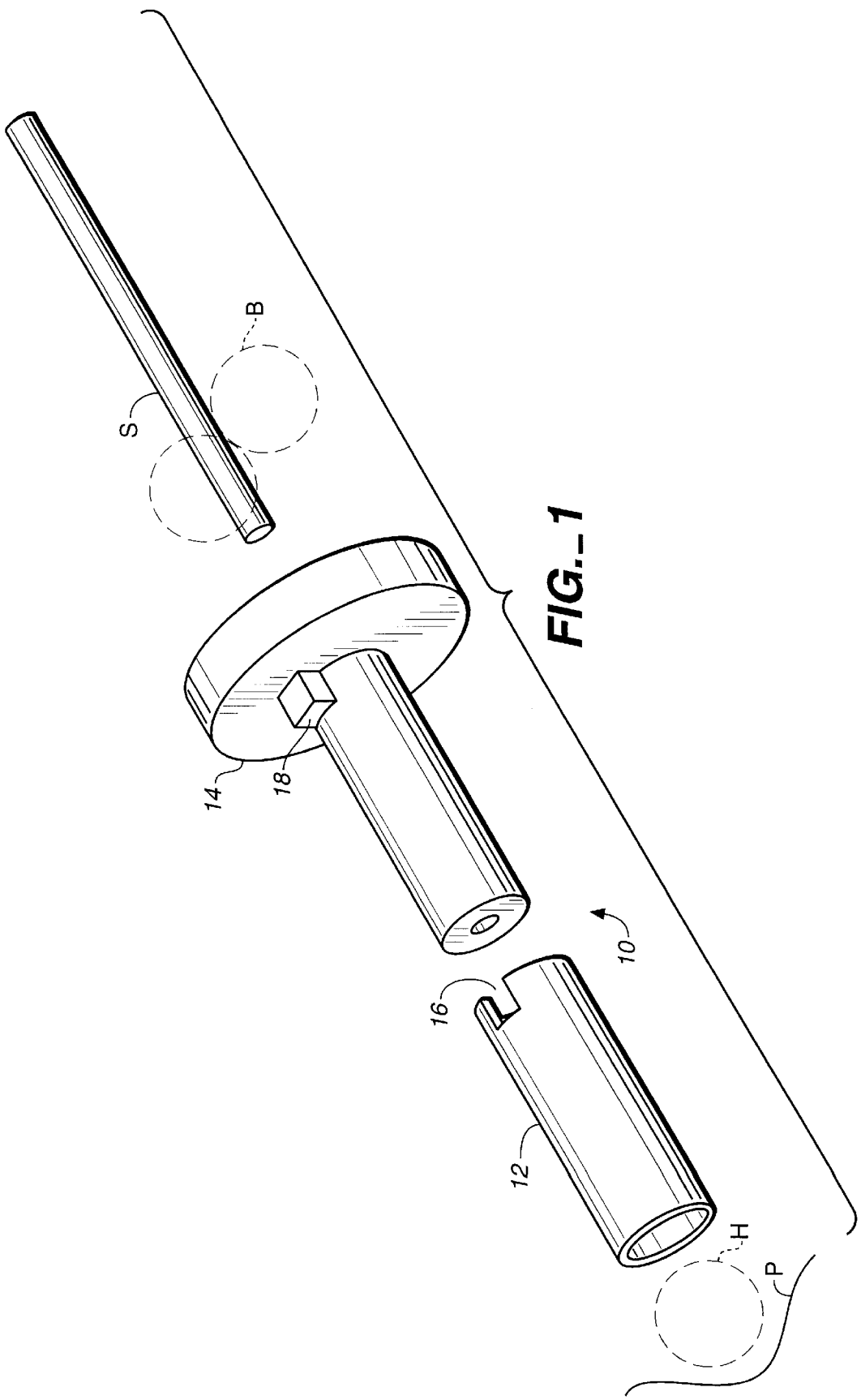
FIG._1

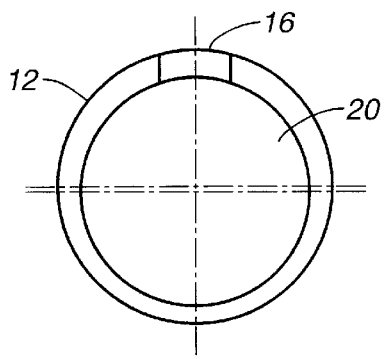
FIG._2A
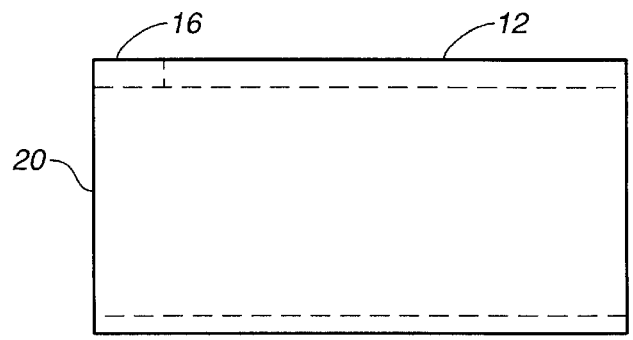
FIG._2B
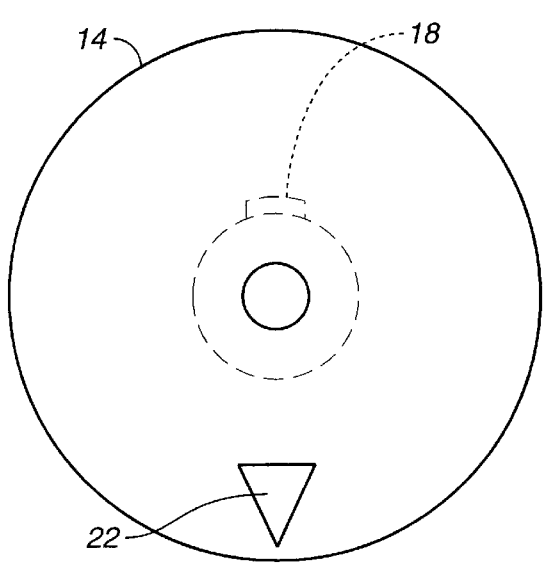
FIG._3A
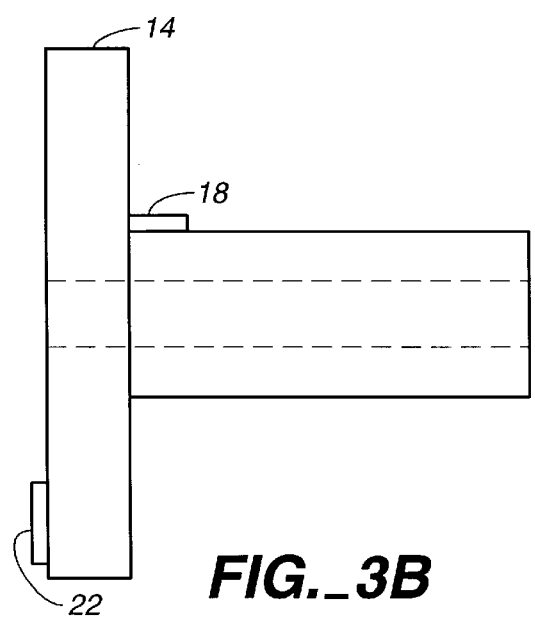
FIG._3B

PROPELLER BALANCING METHOD AND APPARATUS

BACKGROUND OF THE INVENTION

1. Field of the Invention

This invention relates generally to aircraft propeller hardware and maintenance, and more specifically to an improved method and apparatus for propeller balancing, particularly for model aircraft propellers.

2. Description of the Prior Art

The conventional method of balancing a propeller (for both model aircraft and full-size aircraft) is to alter the propeller itself by attempting to move the propeller's center of gravity to align with the propeller's center mounting hole. In the case of a two-bladed propeller, this is often accomplished by placing the propeller on a balance stand and adding mass (weight) to the light blade(s), and/or removing mass (weight) from the heavy blade(s). This is a cumbersome and time-consuming process, and requires provision for weights and their attachment to the propeller blades. In addition, this process may result in having to refinish a blade if too much or inappropriate material was removed.

SUMMARY OF THE INVENTION

The propeller balancing method and apparatus of this invention provides a simple and efficient way to balance propeller blades including, but not limited to, those used on model aircraft. The inventive method comprises relocation of the propeller's center mounting hole to the propeller's center of mass. This is accomplished by installation of appropriate eccentric bushings into the center mounting hole, and preferably into an oversize center mounting hole that has been created in the propeller hub. Both spanwise (tip to tip) and chordwise (i.e., perpendicular to spanwise) propeller balance can be made with this eccentric bushing method.

The preferred method includes the following steps: A conventional balance stand is provided for the balancing process. The propeller's existing center hole is drilled to a pre-determined oversize condition. A suitable eccentric bushing is installed into the propeller center hole on a concentric bushing insertion tool. The eccentric bushing preferably includes a notch or locator slot which can be engaged by a complementary drive tang on the insertion tool. Thus installed, the special tool is capable of rotating the eccentric bushing within the propeller's center hole until the center of the hole of the eccentric bushing aligns with the center of gravity of the propeller. It is apparent that different amounts of eccentricity may be required, depending upon the weight of the propeller and the degree to which it was initially out of balance. To get balance within acceptable operating limits, a series of graduated eccentric bushings may be provided (i.e., bushings having varying and increasing degrees of eccentricity).

BRIEF DESCRIPTION OF THE DRAWINGS

FIG. 1 is an exploded perspective view of the components of a propeller balancing apparatus of this invention being installed onto a typical propeller for balancing on a typical balance stand;

FIG. 2A is an end elevation view of an eccentric bushing of the propeller balancing apparatus of this invention, illustrating its locator slot and (offset) center hole;

FIG. 2B is a side elevation view of the eccentric bushing of FIG. 2A;

FIG. 3A is an end elevation view of a concentric bushing tool of the propeller balancing apparatus of this invention, illustrating its drive tang for engagement with an eccentric bushing locator slot, and its indicator arrow opposite the drive tang; and FIG. 3B is a side elevation view of the concentric bushing tool of FIG. 3A.

DETAILED DESCRIPTION OF A PREFERRED EMBODIMENT

FIG. 1 is an exploded perspective view of the components of a propeller balancing apparatus 10 of this invention being installed onto a typical propeller P for balancing on a typical balance stand B. Propeller P's center hole H is preferably drilled to a pre-determined oversize condition. Eccentric bushing 12 is installed into the propeller center hole H on concentric bushing insertion tool 14, so that notch or locator slot 16 of the eccentric bushing 12 can be engaged by a complementary drive tang 18 on the insertion tool.

The assembled bushing and insertion tool are pressed into the propeller hub hole and around the balance stand shaft S through the hole in the insertion tool. The complete assembly is then placed on the balance stand with the propeller blades in a horizontal position. An arrow pointer on the tool (opposite the location of the drive tang engaging the slot, which is preferably positioned on the "thicker" side of the eccentric bushing) should be pointing "UP".

Since balance stands are very sensitive, the heavy blade will go down. The tool pointer is then turned in small increments toward the heavy blade, thereby moving the center of the mounting hole closer to the heavy blade until balance is effected. It is desired to have the arrow pointing as nearly as possible toward the heavy blade so that chordwise balance is not unduly disturbed. A bushing with greater or less offset may be required (sufficient eccentricity to effect balance is required, but too much eccentricity may cause an unacceptable chordwise balance condition).

Should chordwise balance also be desired, the propeller may be placed in the vertical position and a suitable offset be determined in a manner similar to the horizontal procedure. The final balance in this case will be a vector of the two offsets.

FIG. 2A is an end elevation view, and FIG. 2B is a side elevation view of an eccentric bushing 12 of the propeller balancing apparatus of this invention, illustrating its locator slot 16 and (offset) center hole 20.

FIG. 3A is an end elevation view, and FIG. 3B is a side elevation view of a concentric bushing tool 14 of the propeller balancing apparatus of this invention, illustrating its drive tang 18 for engagement with the eccentric bushing locator slot, and its indicator arrow 22 opposite the drive tang.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims.

I claim:

1. A method for weight balancing a propeller about a center of gravity, said propeller having a plurality of propeller blades disposed about a hub having a center mounting hole, said method comprising the steps of:

providing a balance stand having a balance shaft;

installing an eccentric bushing into the propeller center mounting hole, said eccentric bushing having a center;

rotating said eccentric bushing within the propeller center mounting hole until said center of said eccentric bushing aligns with the center of gravity of the propeller.

2. The method for weight balancing a propeller of claim 1 further including the step of:

installing said eccentric bushing into the propeller center mounting hole with a concentric bushing tool.

3. The method for weight balancing a propeller of claim 2 further including the steps of:

providing said eccentric bushing with a locator slot, and providing said concentric bushing tool with a drive tang adapted to engage said eccentric bushing locator slot.

4. An apparatus for weight balancing a propeller about a center of gravity, said propeller having a plurality of propeller blades disposed about a hub having a center mounting hole, said apparatus comprising:

a balance stand having a balance shaft;

an eccentric bushing adapted for insertion into the propeller center mounting hole, said eccentric bushing having a center, wherein said eccentric bushing may be rotated within the propeller center mounting hole until said center of said eccentric bushing aligns with the center of gravity of the propeller.

5. The apparatus for weight balancing a propeller of claim 4 further including a concentric bushing tool for installing said eccentric bushing into the propeller center mounting hole.

6. The apparatus for weight balancing a propeller of claim 5 wherein said eccentric bushing includes a locator slot, and said concentric bushing tool includes a drive tang adapted to engage said eccentric bushing locator slot.

* * * * *